Patented May 21, 1929.

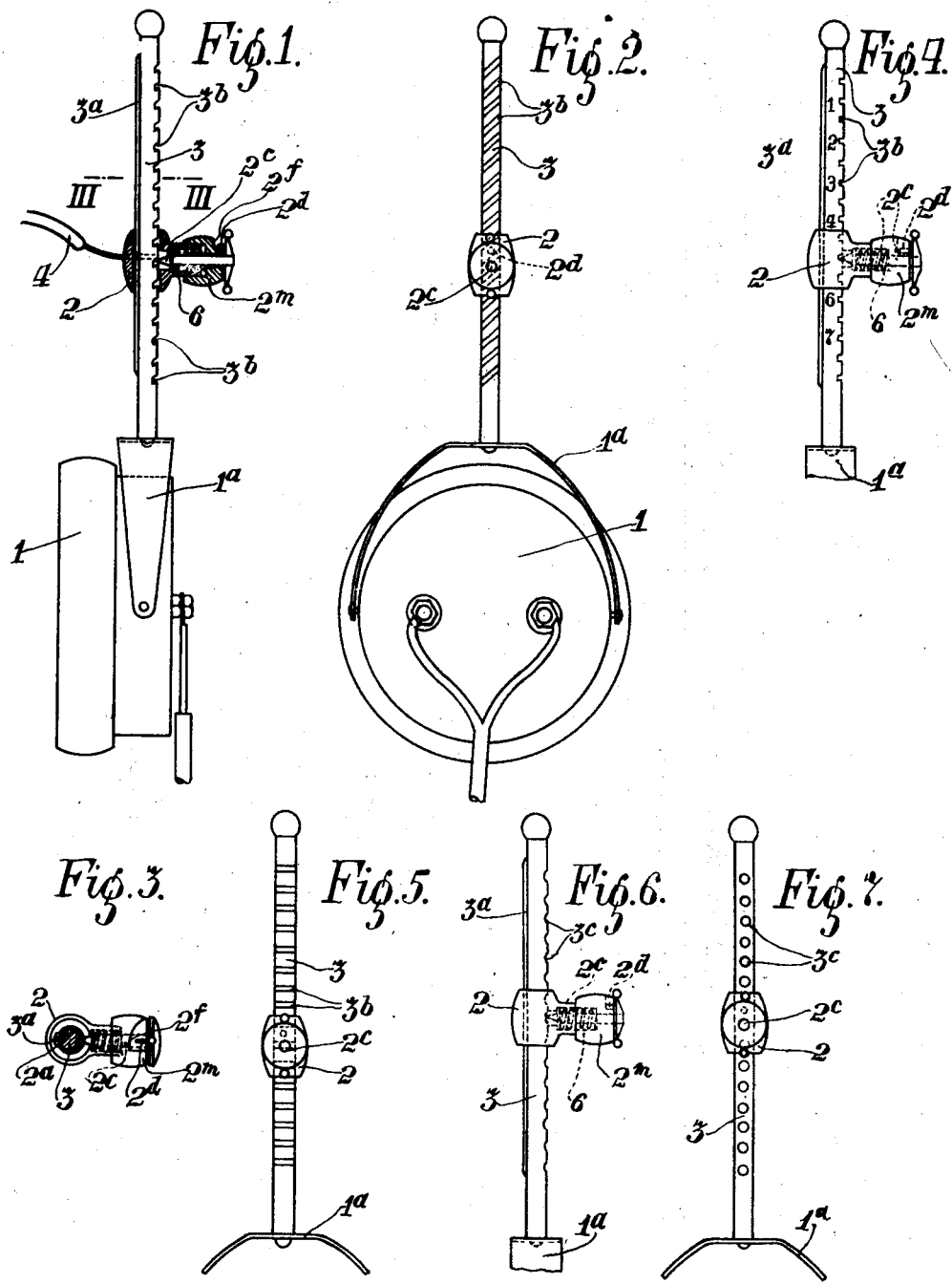

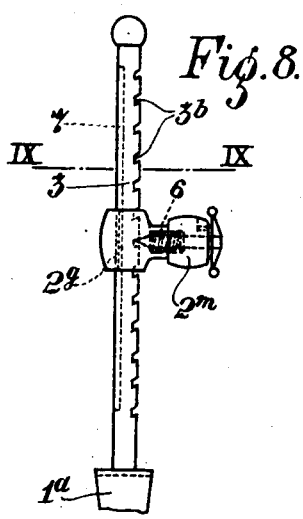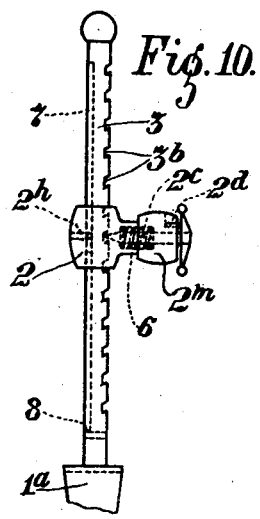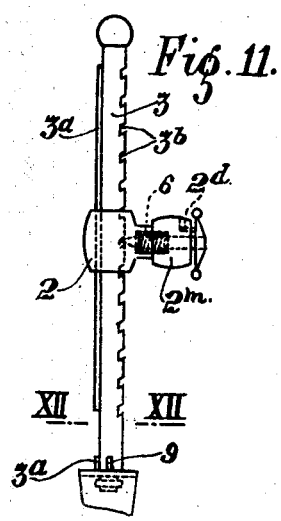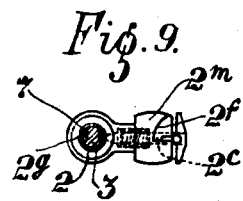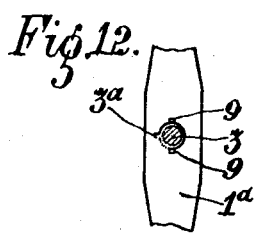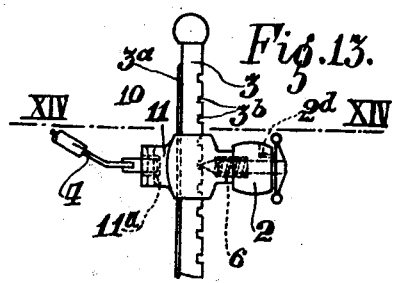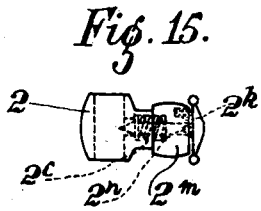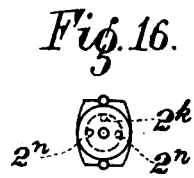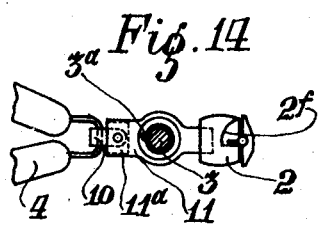

1,714,377

UNITED STATES PATENT OFFICE.

GEORGE KIERNAN, OF BELFAST, NORTHERN IRELAND.

TELEPHONE RECEIVER.

Application filed November 14, 1927, Serial No. 233,258, and in Great Britain November 22, 1926.

This invention relates to telephone receivers of the class known as "head-phones", in which two ear pieces are connected to a head band, or head bands. The object of the invention is to provide adjustable ear pieces which will not allow the leads to the ear pieces to become twisted.

According to this invention a limited turning movement only of each ear piece is permitted by the connection between the ear piece and the head band combined with vertical adjustment and means for locking the ear piece at different vertical adjustments, the limited turning movement being available for comfortable turning adjustment of the ear piece at all positions of the vertical adjustment.

In carrying out the invention the restrictive control of turning movement of the ear pieces may be effected in connection with the usual sleeve connection, or clamp, through which a rod connected with the ear piece is slidably supported, or the restrictive means may be provided at the bottom of said rod where the ear piece is connected with it. Restriction of turning movement of the ear pieces may be obtained by providing a longitudinal groove in the rod to which the ear piece is connected, a projecting member in the sleeve connection, or clamp, being adapted to engage the said groove, but preferably a feather would be provided longitudinally on the rod and adapted to engage in the groove in the sleeve connection, or clamp. In both cases the groove and projection cooperate to restrict turning movements of the ear piece, but allow sufficient lateral play to ensure comfortable positioning of the ear pieces on the head. This feature of restricted turning is such that it operates irrespective of the position to which vertical adjustment may have brought the connecting sleeve or clamp, on the rod which carries the ear piece. Vertical adjustment of the ear pieces relatively to the sleeve connection, or clamp, connected with the head band, or head bands, is preferably effected by providing a spring catch in connection with the sleeve connection to the head band, or head bands and comprising a pin, or member caused, under spring action, to press against the rod so that it will, when permitted engage grooves, or holes formed on the rod so as to secure the head band sleeve connection to the rod at any required position thereon.

The clamping member may be moved out of engagement with a groove by causing a portion of the clamping member to engage a cam surface on, or connected with, the sleeve, whereby a turning movement of the clamping member will cause its withdrawal, against spring means from engagement with the rod.

The invention will now be described with reference to the accompanying drawings whereon several ways of carrying out the invention are shown as examples.

Referring to the drawings:—

Figs. 1 and 2 are respectively front and side elevations of a telephone receiver or head-phone showing the invention applied thereto, Fig. 1 being partly in section to show details of construction.

Fig. 3 is a sectional plan view on the line 3—3 Fig. 1.

Figs. 4 and 5 are respectively front and side elevations of a modified form of groove on the rod connected with the ear piece.

Figs. 6 and 7 are respectively front and side elevations of the rod connected with the ear piece, showing a series of depressions or holes instead of grooves.

Fig. 8 is a front elevation of the rod connected with the ear piece showing a modification in which a longitudinal groove in the rod engages a feather on the sleeve.

Fig. 9 is a sectional plan view on the line 9—9 Fig. 8.

Fig. 10 is a front elevation corresponding to Fig. 8 but showing a pin in place of the feather in the sleeve and also showing a circumferential groove round the rod near the bottom thereof and permitting unrestricted turning movements of the ear piece.

Figs. 11 and 12 are respectively front elevation and sectional plan views of the rod, the sectional plan being on the line 12—12 Fig. 11, showing another modification in which the rod is not turnable relatively to the clamp but is turnable relatively to the ear piece connection, the means for restricting turning movements being at the bottom of the rod where the ear piece is connected with it.

Fig. 13 is a still further modification and shows the ear piece rod in elevation and showing the clamp connection with the head band adapted to permit restricted turning movements of the ear piece and rod connected therewith relative to the head band.

Fig. 14 is a plan view corresponding to Fig. 13.

Figs. 15 and 16 are respectively front and side elevations of another form of clamp construction in which a pull out arrangement replaces the cam arrangement shown in the other figures of the drawings.

Referring to the drawings:

Restrictive control of the turning movement of the ear pieces 1 may, as shown in Figs. 1 to 3, be effected in connection with the usual sleeve connection, or clamp 2 through which a rod 3 connected with the ear piece is slidably supported. A longitudinal projection $3^a$ on the rod 3 engages a groove $2^a$ in the sleeve or clamp 2 attached to the head band or head bands 4. The longitudinal projection $3^a$ on the rod 3 and the groove $2^a$ in the sleeve 2 will restrict turning movements of the rod 3 and consequently of the ear piece 1. In addition to providing for restrictive control of turning movement of the ear pieces, I provide for vertical adjustment of the ear pieces, by having a number of lateral grooves $3^b$ in the supporting rod 3 with a pin or spring catch $2^c$ in the clamp 2 capable of engaging a groove $3^b$ at any required position. In Figs. 1 and 2 the grooves $3^b$ are shown at an angle to the axis of the rod 3 being a sectional part of a spiral cut into the surface of the rod. These lateral grooves $3^b$ only go partly round the rod, giving the necessary freedom of turning when the spring catch $2^c$ in the clamp 2 is in engagement with a groove $3^b$ in the rod 3. The spring catch, or pin $2^c$ or equivalent, in the clamping member 2 is adapted to engage a lateral groove in the rod at any required position and, when required, to be disengaged therefrom to allow the clamping sleeve member 2 to slide freely on the rod 3 or the rod 3 to slide freely in the sleeve member 2 a restricted turning movement being obtainable when the pin $2^c$ of the clamping member 2 is engaged in one of the grooves $3^b$ or disengaged therefrom. The clamping pin $2^c$ may be moved out of engagement with a groove $3^b$ by a member $2^d$ thereon engaging a cam surface $2^f$ on, or connected with, the sleeve 2 whereby a turning movement of the clamping pin $2^c$ will cause its withdrawal, against spring means 6 from engagement with a groove $3^b$ whilst a reverse movement will, under the reaction of the spring means 6 cause the clamping pin $2^c$ to engage a groove $3^b$. Instead of the spring actuated clamping pin described, I may provide a screw clamping pin whereby a turning movement in one direction will cause it to engage a groove $3^b$ in the rod 3 whilst a turning movement in the reverse direction will cause it to be disengaged therefrom. The grooves $3^b$ may be horizontal as shown at Figs. 4 and 5.

The grooves $3^b$ as described, may as shown at Figs. 6 and 7, be replaced by a series of holes, or depressions $3^c$ in the rod 3. Preferably these holes $3^c$ are more or less tapered and adapted to permit of the restricted turning movement of the clamping pin $2^c$ when the pin is in engagement with a hole $3^c$.

If desired, as shown at Figs. 1 to 7 a portion may be left at the bottom of the rod 3 without any grooves, or depressions, or restrictive means thereon to allow for free turning of the sleeve member 2 on the rod 3 so that the ear pieces 1 may be allowed to turn in such a manner as will permit of them lying flat and face down on a table, or other surface.

In order to facilitate adjustment of the ear pieces to approximately the correct position before placing them on the head, I may, as shown at Fig. 4 provide a scale for example a series of numbers or letters on the rod at the side of the grooves.

As shown at Figs. 8, 9 and 10, restriction of lateral movement of the telephone ear pieces 1 is obtained by providing a longitudinal groove 7 in the rod 3 to which the ear piece 1 is connected, said groove 7 being engaged by a feather $2^g$ on the sleeve of the clamp 2 as shown at Figs. 8 and 9 or by a pin $2^h$ as shown at Fig. 10, the groove and feather, or pin, permitting sufficient turning movement of the rod 3 and ear piece 1 attached thereto as will allow it to position itself as required by the wearer. In Fig. 10 a circumferential groove 8 is provided at the bottom of, and in communication with, the groove 7, whereby complete turning movements of the rod 3 and ear piece 1 attached thereto can be obtained when the pin $2^h$ is in the groove 8.

As shown at Figs. 11 and 12 the restrictive means for controlling turning movements of the rod 3 and ear piece 1 attached thereto may be at the bottom of the rod 3 when the rod 3 is turnable relative to the ear piece 1. Projections 9 on the ear piece carrier $1^a$ co-operate with the feather $3^a$ on the rod 3 to limit turning movements. In this case the rod 3 and sleeve 2 are not turnable relatively to each other.

In the example shown at Figs. 13 and 14 a limited turning movement of each ear piece is permitted by the connection between the ear piece and the head band 4 combined with vertical adjustment and means for locking the ear piece at different vertical adjustments, the limited turning movement being available for comfortable adjustment of the ear piece at all positions of the vertical adjustment. The restrictive control of turning movement of the ear pieces is shown effected in connection with the usual sleeve connection, or clamp 2 through which the rod 3 connected with the ear piece is slidably supported. A hinged or turnable connection is provided between the head band 4 and the sleeve connection, or clamp 2, the ends of the head band 4 being connected to a member 10 turnably supported by the sleeve, or clamp 2 which is arranged on the rod 3 so as to be vertically adjustable thereon but not turnable laterally thereon, any turning movements being obtained through the connection 10 between the head band 4 and the sleeve, or clamp 2. Turning movements are restricted by having the member 10 working in a limited slot $11^a$ in a projection 11 on the clamp 2. Similarly, a ball supported in a ball race on the sleeve, or clamp may form the connecting member between the end of the head band and the sleeve, or clamp, the ball being permitted only restricted turning movement.

When the means for restricting the turning movements of the ear piece is provided at the bottom of the rod as described at Figs. 11 and 12, or at the connection between the ear piece and the head band as described at Figs. 13 and 14, the rod may be of any suitable shape in cross section which would permit of the sleeve of the clamp 2 sliding freely on the rod 3 or the rod 3 sliding freely in the sleeve member 2.

A further modification of the clamping means is shown at Figs. 15 and 16. In this example the clamping pin $2^c$ is pulled out against the spring 6 to release the pin $2^c$ from engagement with the grooves $3^b$. When the pin $2^c$ is to engage the grooves the member $2^d$ thereon is caused to enter a hole, or depression $2^k$ in the portion $2^m$ of the clamp, the hole, or depression $2^k$ being sufficiently deep to allow the point of the pin $2^c$ to enter one of the grooves $3^b$. When the pin $2^c$ is withdrawn from the groove $3^b$ and turned in one direction or the other, the member $2^d$ can then be entered into a shallower hole, or depression $2^n$ on one side, or the other of the hole, or depression $2^k$. When the member $2^d$ is engaged in one or other of the holes, or depressions $2^n$ then the pin $2^c$ will be held clear of the grooves in the rod 3 and the clamp and sleeve will be free to slide on the rod, or the rod be free to slide in the clamp, or sleeve as required.

I claim:—

1. A head phone comprising a head band, two ear pieces, a separate serrated rod attached to each ear piece, a sleeve at each end of the head band in each of which sleeves one of said rods is slidable and by which the associated ear piece is pivotally connected to the head band, a spring pressed pin in each sleeve adapted to engage with any one of the serrations on the rod therein, and means for limiting the turning movement of each ear piece about its pivotal connection to the head band.

2. A head phone comprising a head band, two ear pieces, a separate serrated rod attached to each ear piece, a sleeve at each end of the head band in each of which sleeves one of said rods is slidable and by means of which the associated ear piece is pivotally connected to the head band, a spring pressed pin in each sleeve adapted to engage with any one of the serrations on the rod therein, a cam edge in each sleeve around the pin which on turning of the pin causes movement thereof towards or away from the rod, and means for limiting the turning movement of each ear piece about its pivotal connection to the head band.

3. A head phone comprising a head band, two ear pieces, a separate rod attached to each ear piece, a sleeve at each end of the head band in each of which sleeves one of said rods is slidable and turnable, and a tongue and groove connection between each sleeve and the rod in it, to allow only limited turning movement of the rod in the sleeve.

4. A head phone comprising a head band, two ear pieces, a separate serrated rod attached to each ear piece, a sleeve at each end of said head band in each of which sleeves one of said rods is slidable and turnable, a spring pressed pin in each sleeve adapted to engage with any one of the serrations in the rod therein, and a tongue and groove connection between each sleeve and the rod therein to allow only limited turning movement of the ear piece to which the rod is attached relative to the head band.

5. A head phone comprising a head band, two ear pieces, a separate serrated rod attached to each ear piece, a sleeve at each end of said head band in each of which sleeves one of said rods is slidable and turnable, a spring pressed pin in each sleeve adapted to engage with any one of the serrations in the rod therein, a cam edge on each sleeve around the pin therein which, on turning of the pin, causes movement thereof towards or away from the rod, and a tongue and groove connection between each sleeve and the rod therein to allow only limited turning movement of the ear piece to which the rod is attached relative to the head band.

6. A head phone comprising a head band, two ear pieces, a separate rod attached to each ear piece, a sleeve at each end of the head band in each of which sleeves one of said rods is slidable and turnable, a groove in each sleeve and a longitudinal feather on the rod in the sleeve and engaging said groove in which it is a loose fit, to allow only limited turning movement of the rod in the sleeve.

7. A head phone comprising a head band, two ear pieces, a separate serrated rod attached to each ear piece, a sleeve at each end of the head band in each of which sleeves one of said rods is slidable and turnable, a spring pressed pin in each sleeve adapted to engage with any one of the serrations in the rod therein, a groove in each sleeve and a longitudinal feather on the rod in the sleeve and engaging said groove in which it is a loose fit, to allow only limited turning movement of the ear piece to which the rod is attached relative to the head band.

8. A head phone comprising a head band, two ear pieces, a separate serrated rod attached to each ear piece, a sleeve at each end of said head band in each of which sleeves one of said rods is slidable and turnable, a spring pressed pin in each sleeve adapted to engage with any one of the serrations in the rod therein, a cam edge on each sleeve around the pin therein which, on turning of the pin, causes movement thereof towards or away from the rod, a groove in each sleeve and a longitudinal feather on the rod in the sleeve and engaging said groove in which it is a loose fit, to allow only limited turning movement of the ear piece to which the rod is attached relative to the head band.

9. A head phone comprising a head band, two ear pieces, a separate rod attached to each ear piece, a sleeve at each end of the head band in each of which sleeves one of said rods is slidable and turnable; a groove in each sleeve and a longitudinal feather on the rod in the sleeve and engaging said groove in which it is a loose fit, to allow only limited turning movement of the ear piece to which the rod is attached relative to the head band, each rod having a smooth circular portion which, when registering with the corresponding sleeve, allows of unrestricted turning of the ear piece relative to the head band.

10. A head phone comprising a head band, two ear pieces, a separate serrated rod attached to each ear piece, a sleeve at each end of the head band in each of which sleeves one of said rods is slidable and turnable, a spring pressed pin in each sleeve adapted to engage with any one of the serrations in the rod therein, a groove in each sleeve and a longitudinal feather on the rod in the sleeve and engaging said groove in which it is a loose fit, to allow only limited turning movement of the ear piece to which the rod is attached relative to the head band, each rod having a smooth circular portion which, when registering with the corresponding sleeve, allows of unrestricted turning of the ear piece relative to the head band.

11. A head phone comprising a head band, two ear pieces, a separate serrated rod attached to each ear piece, a sleeve at each end of said head band in each of which sleeves one of said rods is slidable and turnable, a spring pressed pin in each sleeve adapted to engage with any one of the serrations in the rod therein, a cam edge on each sleeve around the pin therein which, on turning of the pin, causes movement thereof towards or away from the rod, a groove in each sleeve and a longitudinal feather on the rod in the sleeve and engaging said groove in which it is a loose fit, to allow only limited turning movement of the ear piece to which the rod is attached relative to the head band, each rod having a smooth circular portion which, when registering with the corresponding sleeve, allows of unrestricted turning of the ear piece relative to the head band.

12. A head phone comprising a head band, two ear pieces, a separate rod attached to each ear piece, a sleeve at each end of the head band in each of which sleeves one of said rods is slidable and turnable, a tongue and groove connection between each sleeve and the rod in it, to allow only limited turning movement of the rod in the sleeve, and means for rendering the limiting means inoperative when required.

In testimony whereof I affix my signature.

GEORGE KIERNAN.